United States Patent
Soong et al.

(10) Patent No.: US 7,848,917 B2
(45) Date of Patent: Dec. 7, 2010

(54) COMMON WORD GRAPH BASED MULTIMODAL INPUT

(75) Inventors: Frank Kao-Ping K. Soong, Warren, NJ (US); Jian-Lai Zhou, Beijing (CN); Peng Liu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1084 days.

(21) Appl. No.: 11/394,809

(22) Filed: Mar. 30, 2006

(65) Prior Publication Data

US 2007/0239432 A1   Oct. 11, 2007

(51) Int. Cl.
*G06F 17/27* (2006.01)

(52) U.S. Cl. .............. 704/9; 704/1; 704/10; 704/231; 704/251; 704/257; 707/706; 707/707; 707/708; 382/159; 382/116; 382/187; 382/228

(58) Field of Classification Search .......... 704/1, 704/9, 10, 231, 251, 257; 707/2–6, 706–708; 382/159, 116, 187, 228
See application file for complete search history.

(56) References Cited

U.S. PATENT DOCUMENTS

| | | | |
|---|---|---|---|
| 5,502,774 A * | 3/1996 | Bellegarda et al. | 382/159 |
| 5,600,765 A * | 2/1997 | Ando et al. | 345/668 |
| 5,677,993 A * | 10/1997 | Ohga et al. | 704/257 |
| 5,748,974 A * | 5/1998 | Johnson | 704/9 |
| 5,855,000 A * | 12/1998 | Waibel et al. | 704/235 |
| 5,884,249 A * | 3/1999 | Namba et al. | 704/9 |
| 6,415,256 B1 * | 7/2002 | Ditzik | 704/231 |
| 6,904,405 B2 * | 6/2005 | Suominen | 704/235 |
| 6,964,023 B2 | 11/2005 | Maes et al. | |
| 7,069,215 B1 * | 6/2006 | Bangalore et al. | 704/255 |
| 7,277,732 B2 | 10/2007 | Chen et al. | |
| 7,467,089 B2 * | 12/2008 | Roth et al. | 704/270 |
| 7,496,513 B2 | 2/2009 | Soong et al. | |
| 2003/0225825 A1 | 12/2003 | Healey et al. | |
| 2004/0133428 A1 * | 7/2004 | Brittan et al. | 704/276 |
| 2007/0100635 A1 * | 5/2007 | Mahajan et al. | 704/276 |

OTHER PUBLICATIONS

Busso et al., Analysis of emotion recognition using facial expressions, speech and multimodal information, 2004, Proceedings of the 6th internation conference on Multimodal interfaces, ACM, pp. 205-211.*
Tax et al., Tax, Combining multiple classifiers by averaging or by multiplying, 2000, Pattern Recognition, vol. 33, No. 9, Elsevier, pp. 1475-1485.*
Patent application for "Combined Input Processing for a Computing Device", filed Jun. 28, 2005, U.S. Appl. No. 11/168,279.
H. Ney, S. Ortmanns, "Dynamic Programming Search for Continuous Speech Recognition", *IEEE Signal Processing Magazine*, 1999.
Chen et al., Language Input System for Mobile Devices, filed Apr. 24, 2001, U.S. Appl. No. 09/843,358.

* cited by examiner

*Primary Examiner*—David R Hudspeth
*Assistant Examiner*—Lamont M Spooner
(74) *Attorney, Agent, or Firm*—Steven M. Koehler; Westman, Champlin & Kelly, P.A.

(57) ABSTRACT

Multiple input modalities are selectively used by a user or process to prune a word graph. Pruning initiates rescoring in order to generate a new word graph with a revised best path.

14 Claims, 9 Drawing Sheets

COMMON WORD GRAPH BASED MULTIMODAL INPUT

BACKGROUND

The discussion below is merely provided for general background information and is not intended to be used as an aid in determining the scope of the claimed subject matter.

There are a number of different input devices that provide input to a computing device. For example, keyboards, pointing devices, touch screens, scanners, digital/video cameras and microphones can all be operably coupled to a computing device in order for a user to provide input to the computing device. Different input devices have different functions. Input from some devices, i.e., keyboards, pointing devices, and touch screens to a computer can be easily converted to commands executed by the computing device. Other inputs (for example, speech, handwriting, computer vision (e.g. lip reading) and gesturing) from scanners, digital/video cameras and microphones must be converted to input text and/or computer commands with some advanced technology. Typically, these inputs utilize a recognizer that analyzes the user's input to provide a recognition result. These inputs can be prone to errors and/or take a long time to input. For example, handwriting input can take a user a large amount of time to input. In particular, writing a character in an Asian language (i.e. Chinese, Japanese, Korean, etc.) can take numerous strokes of pen input. Even after the user has completed pen input, the recognition result may still not be correct.

Other forms of input have different shortcomings. Although speech recognition allows a user to input information quickly, this form of input can suffer from a high recognition error rate, particularly in a noisy environment. In contrast, providing input via a keyboard can be quite accurate; however if the keyboard is small, such as commonly found in small computing devices, or the user is unfamiliar with the location of the keys as found in a typical keyboard, user manipulation may take a considerable amount of time.

SUMMARY

This Summary and the Abstract are provided to introduce some concepts in a simplified form that are further described below in the Detailed Description. The Summary and Abstract are not intended to identify key features or essential features of the claimed subject matter, nor is it intended to be used as an aid in determining the scope of the claimed subject matter. In addition, the description herein provided and the claimed subject matter should not be interpreted as being directed to addressing any of the short-comings discussed in the Background.

Multiple input modalities such as but not limited to speech recognition, handwriting recognition, input from a keyboard, lip-reading, are selectively used by a user or process to change or otherwise correct a word or words of a word graph. The correction process can be considered a form of pruning, which initiates rescoring in order to rerank the word graph with a revised best path.

DETAILED DESCRIPTION

One general concept herein described uses multiple modalities to process a common word graph known to a processing system. The common word graph can be initialized from a language model (e.g. N-gram or CFG). Using any input modality, such as but not limited to speech recognition, handwriting recognition, input from a keyboard, lip-reading, a user or process can change or otherwise correct a word or words of the word graph. The correction process can be considered a form of rescoring and pruning, which initiates rescoring in order to generate a new path through an updated, new word graph. By employing complementary information from different input modalities, the correct word path intended by the user or process is rapidly determined.

However, before describing further aspects, it may be useful to first describe exemplary computing devices or environments that can implement the description provided below.

Figure 1:
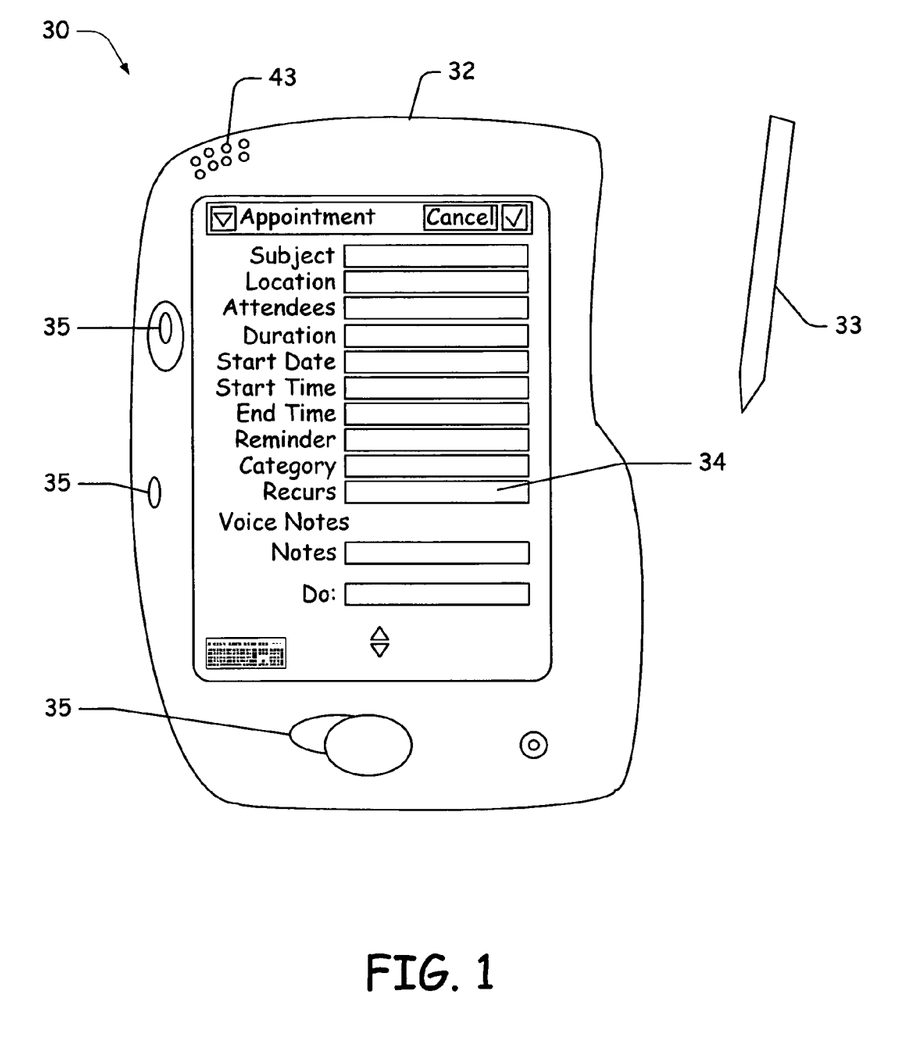
FIG. 1 is a schematic diagram of a mobile device.

An exemplary form of a data management mobile device 30 is illustrated in FIG. 1. The mobile device 30 includes a housing 32 and has a user interface including a display 34, which uses a contact sensitive display screen in conjunction with a stylus 33. The stylus 33 is used to press or contact the display 34 at designated coordinates to select a field, to selectively move a starting position of a cursor, or to otherwise provide command information such as through gestures or handwriting. Alternatively, or in addition, one or more buttons 35 can be included on the device 30 for navigation. In addition, other input mechanisms such as rotatable wheels, rollers or the like can also be provided. Another form of input can include a visual input such as through a camera and computer vision recognition.

Figure 2:
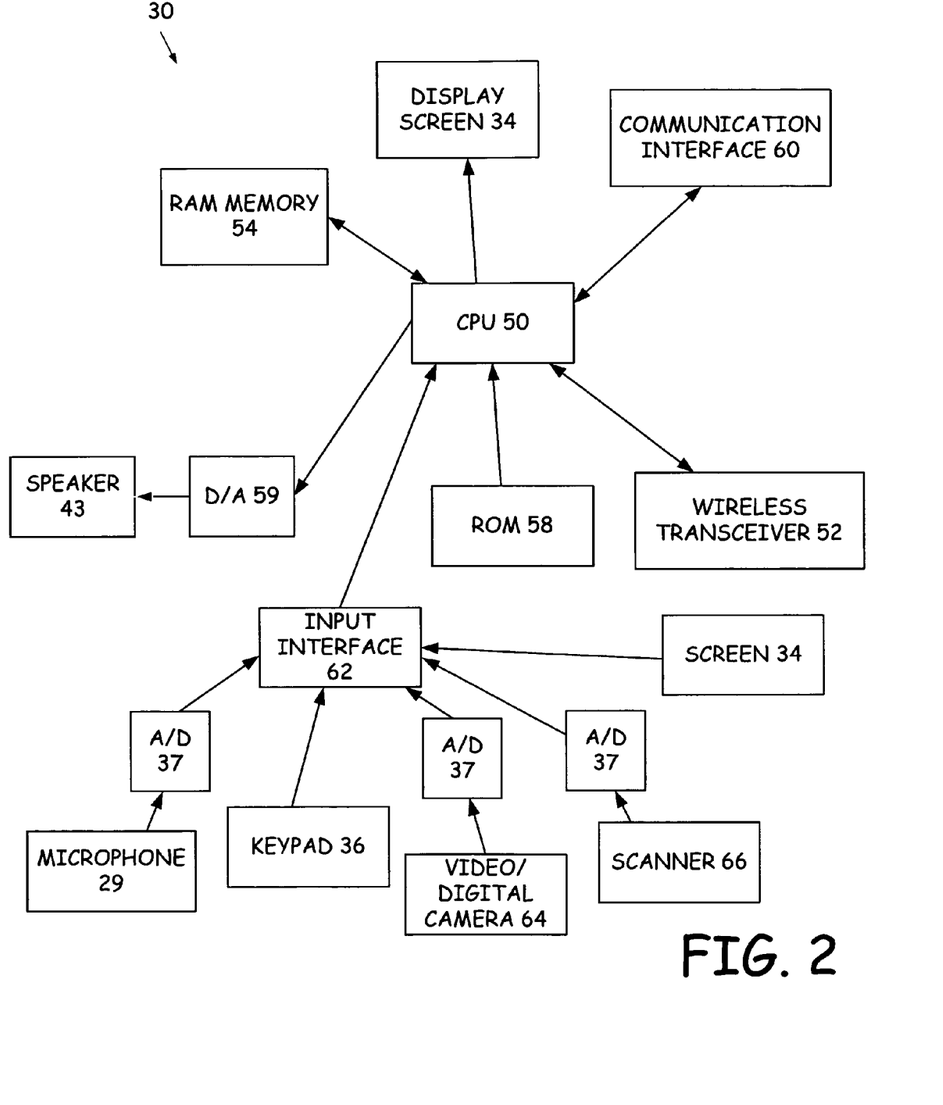
FIG. 2 is a block diagram of components in the mobile device of FIG. 1.

Referring now to FIG. 2, a block diagram illustrates the functional components comprising the mobile device 30. A central processing unit (CPU) 50 implements the software control functions. CPU 50 is coupled to display 34 so that text and graphic icons generated in accordance with the controlling software appear on the display 34. A speaker 43 can be coupled to CPU 50 typically with a digital-to-analog converter 59 to provide an audible output. Data that is downloaded or entered by the user into the mobile device 30 is stored in a non-volatile read/write random access memory store 54 bi-directionally coupled to the CPU 50. Random access memory (RAM) 54 provides volatile storage for instructions that are executed by CPU 50, and storage for temporary data, such as register values. Default values for configuration options and other variables are stored in a read only memory (ROM) 58. ROM 58 can also be used to store the operating system software for the device that controls the basic functionality of the mobile 30 and other operating system kernel functions (e.g., the loading of software components into RAM 54).

RAM 54 also serves as storage for the code in the manner analogous to the function of a hard drive on a PC (personal computer) that is used to store application programs. It should be noted that although non-volatile memory is used for storing the code, it alternatively can be stored in volatile memory that is not used for execution of the code.

Wireless signals can be transmitted/received by the mobile device through a wireless transceiver 52, which is coupled to CPU 50. An optional communication interface 60 can also be provided for downloading data directly from a computer (e.g., desktop computer), or from a wired network, if desired. Accordingly, interface 60 can comprise various forms of communication devices, for example, an infrared link, modem, a network card, or the like.

Mobile device 30 includes an input interface 62 to receive input from a user. Example devices that provide input to input interface 62 include microphone 29, screen 34 (through stylus 33 or a touch), keypad 36, video/digital camera 64 and scanner 66. Device 30 also includes one or more analog-to-digital (A/D) converters 37 and an optional recognition program (speech, DTMF, handwriting, gesture and/or computer vision) stored in store 54. By way of example, in response to audible information, instructions or commands from a user of device 30, microphone 29 provides speech signals, which are digitized by A/D converter 37. The speech recognition program can perform normalization and/or feature extraction functions on the digitized speech signals to obtain speech recognition results. Optionally, the speech input and/or the feature extractions can be provided to an external speech recognition program on a different computer and communication with the mobile device 30, which in turn, returns the recognition results.

Similar processing can be used for other forms of input. For example, handwriting input can be digitized on device 30. Likewise, gesture data and visual data can be processed similarly. Depending on the form of input, device 30 (and the other forms of clients discussed below) would include necessary hardware such as video/digital camera 64 for visual input. Again, actual recognition can be performed by a computing device in communication with the mobile device 30, if desired.

Figure 3:
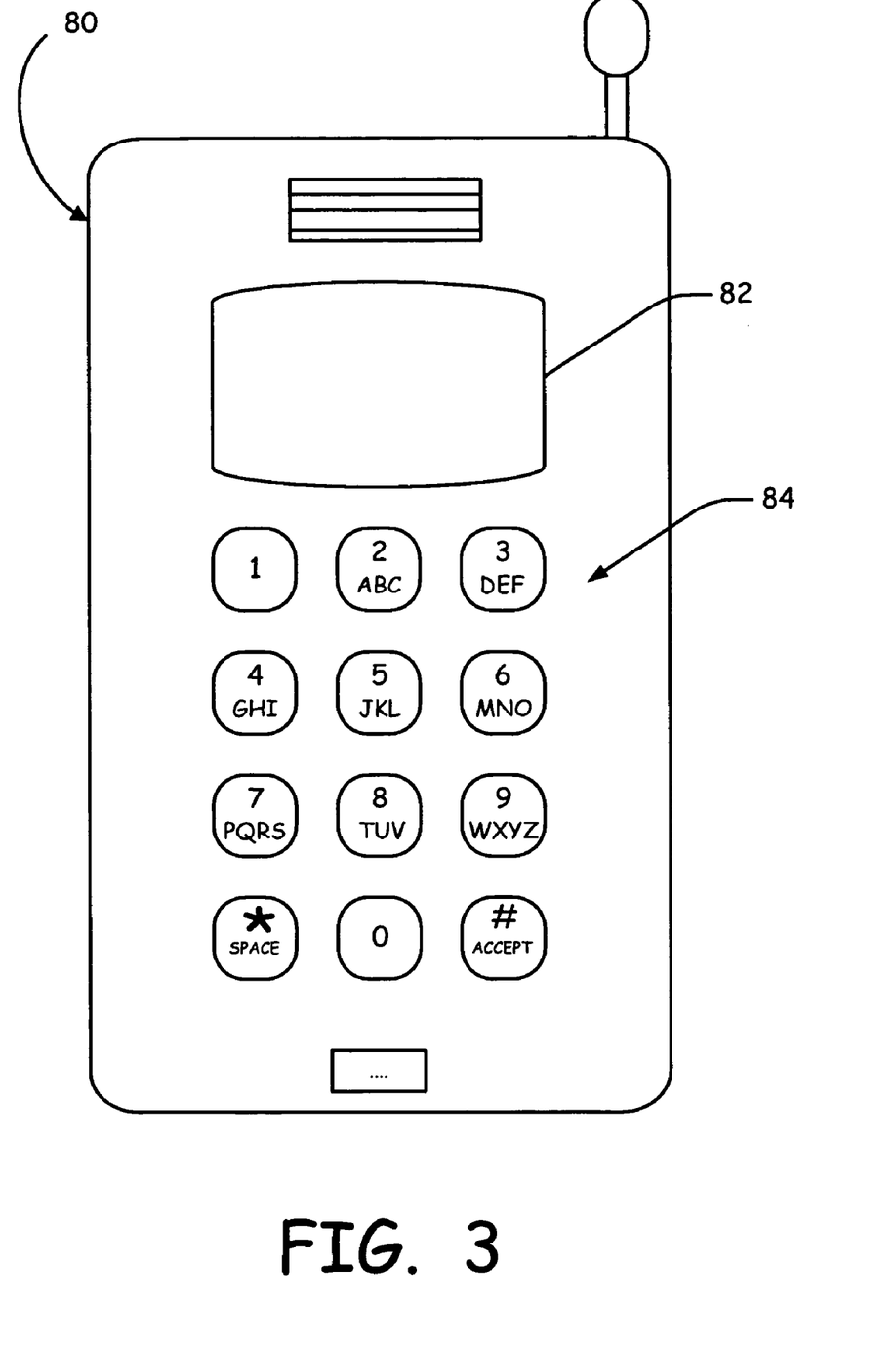
FIG. 3 is a front view of a phone.

FIG. 3 is a plan view of an exemplary embodiment of a portable phone 80. The phone 80 includes a display 82 and a keyboard or keypad 84. Generally, the block diagram of FIG. 2 applies to the phone of FIG. 3, although additional circuitry necessary to perform other functions may be required. For instance, a transceiver necessary to operate as a phone will be required for the embodiment of FIG. 2; however, such circuitry is well known and not necessary for the description herein provided. In some instances, a dictionary or other mechanism is utilized to resolve the intended character. Keys within keypad 84 can be associated with one or more letters and thus input corresponding to the letters needs to be resolved as to which letter was intended. Keypad 84 is distinguished from a standard keypad in that it does not have a unique key for each letter. As such, keypad 84 can be referred to as having a reduced or limited set of keys.

In addition to the portable or mobile computing devices described above, input can be provided to numerous other computing devices such as a general desktop computer. Additionally, various input devices can allow a user with limited physical abilities to input or enter text into a computer or other computing device when other conventional input devices, such as a full alpha-numeric keyboard, are too difficult to operate.

Input can further be provided to numerous other general purpose or special purpose computing systems, environments or configurations. Examples of well known computing systems, environments, and/or configurations that may be suitable for use with the invention include, but are not limited to, regular telephones (without any screen) personal computers, server computers, hand-held or laptop devices, multiprocessor systems, microprocessor-based systems, set top boxes, programmable consumer electronics, radio frequency identification (RFID) devices, network PCs, minicomputers, mainframe computers, distributed computing environments that include any of the above systems or devices, and the like.

Figure 4:
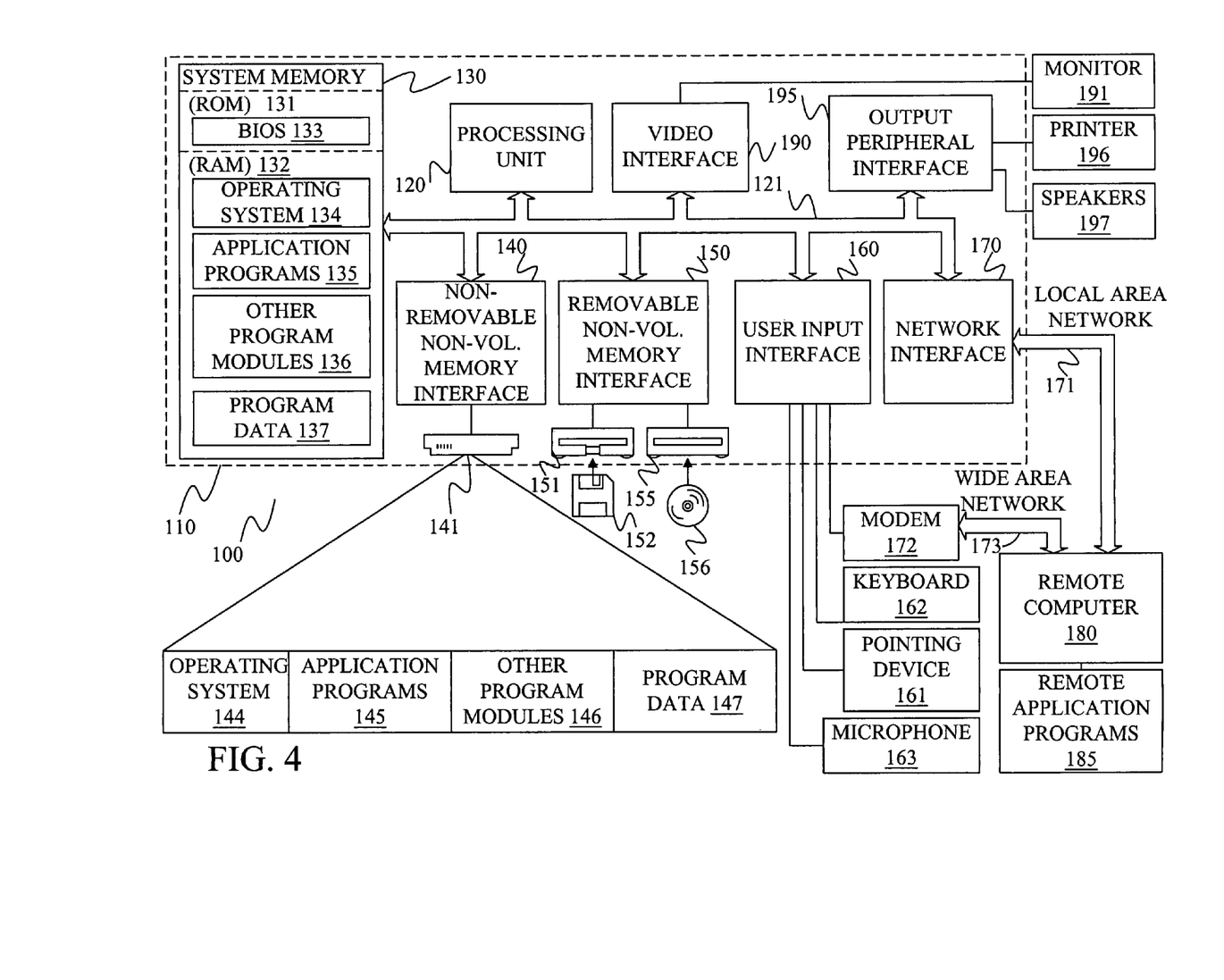
FIG. 4 is a block diagram of a general computing environment.

The following is a brief description of a general purpose computer 100 illustrated in FIG. 4. However, this computing system environment 100 is again only one example of a suitable computing environment and is not intended to suggest any limitation as to the scope of use or functionality of the description below. Neither should the computing environment 100 be interpreted as having any dependency or requirement relating to any one or combination of components illustrated in the exemplary operating environment 100.

In addition to the examples herein provided, other well known computing systems, environments, and/or configurations may be suitable for use with concepts herein described. Such systems include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The concepts herein described may be embodied in the general context of computer-executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computer readable media discussed below.

The concepts herein described may also be practiced in distributed computing environments where tasks are performed by remote processing devices that are linked through a communications network. In a distributed computing environment, program modules may be located in both locale and remote computer storage media including memory storage devices.

With reference to FIG. 4, an exemplary system includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way o example, and not limitation, FIG. 4 illustrates operating system 134, application programs 135, other program modules 136, and program data 137.

The computer 110 may also include other removable/non-removable volatile/nonvolatile computer storage media. By way of example only, FIG. 4 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4, provide storage of computer readable instructions, data structures, program modules and other data for the computer 110. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 4 include a locale area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on remote computer 180. It will be appreciated that the network connections shown are exemplary and other means of establishing a communications link between the computers may be used.

It should be noted that the concepts herein described can be carried out on a computer system such as that described with respect to FIG. 4. However, other suitable systems include a server, a computer devoted to message handling, or on a distributed system in which different portions of the concepts are carried out on different parts of the distributed computing system.

As indicated above, one concept herein described allows a user or process to use multiple modalities to generate and correct the word path selected by the processing system of a common word graph.

Figure 5:
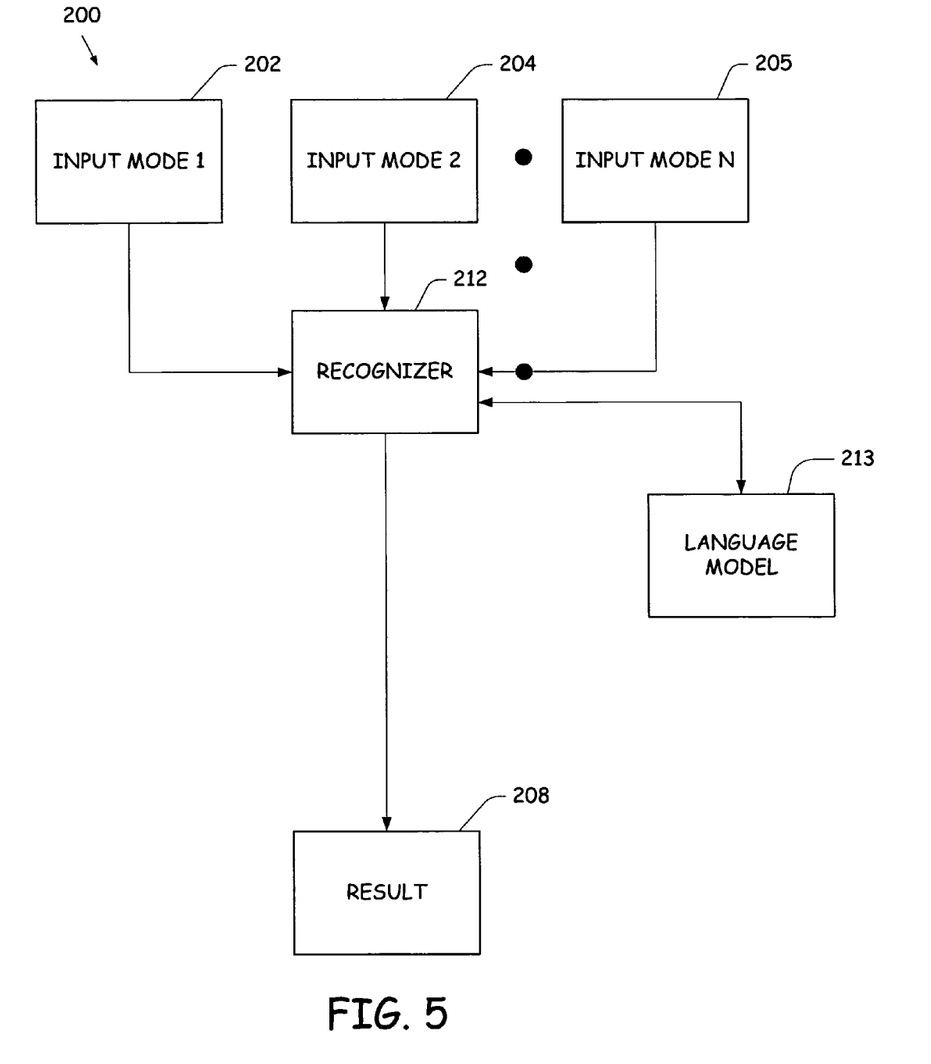
FIG. 5 is a block diagram of an input processing system.

FIG. 5 is a block diagram of an input processing system 200. System 200 receives input from a first input mode 202 and a second input mode 204. It is worth noting that system 200 can be expanded to receive inputs from more than two sources. Input mode 205 represents further input modes in system 200. Herein input mode 202 represents a different mode of input than input mode 204. For example, input mode 202 can be handwriting input such as from a pen or stylus, while input mode 204 can be speech data from a user to a microphone. Recognizer 212 represents processing modules used to process the inputs received via each of the input modes 202, 204 and 205. Generally, recognizer 212 outputs data in a form suitable for further processing by a computing device. For instance, recognizer 212 recognizes the handwriting made by the user, providing corresponding date indicative of the handwriting. Similarly, recognizer 212 can recognize the speech from the user, providing corresponding data indicative of the speech. If input mode 205 is entry of keystrokes on a keypad or keyboard, recognizer 212 can provide output indicative of the keystrokes.

Figure 6:
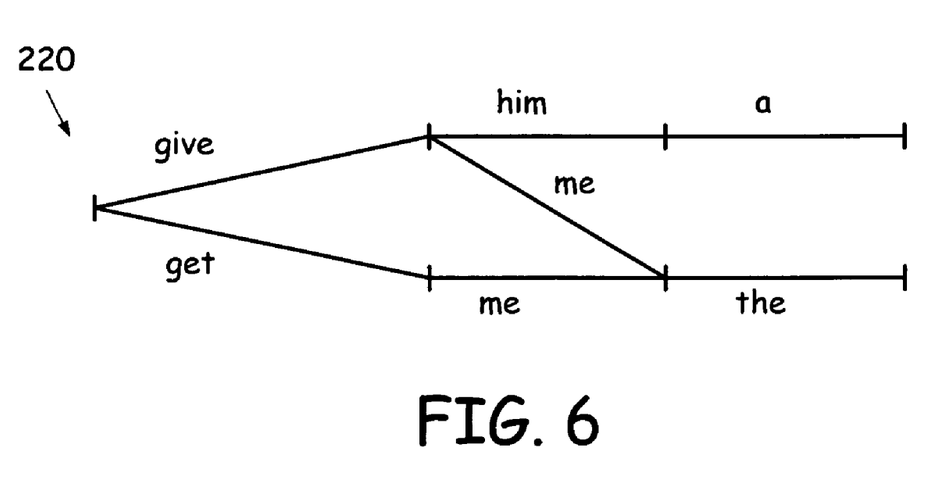
FIG. 6 is a pictorial representation of a word graph.

At this point, it should be noted that the output from recognizer 212 can include a word graph and/or data indicative of a correction for a word or words of the hypothesis chosen from the word graph as best representing what was provided as input by the user or process. A pictorial representation of the word graph is illustrated in FIG. 6 at 220. This word graph will be used later to illustrate operation of the concepts described herein. In this example, the user or process has provided a portion of the sentence including "get me the" via one of the input modalities 202, 204 or 205. The word graph 220 generated by the recognizer 212 includes the set of hypotheses that the input phrase could be. Generally, the word graph organizes the hypotheses in a form of a graph whose edges represent the hypothesized single words. Sometimes, the term "word lattice" is used synonymously. Depending on the complexity of the word graph, overlaps between word hypotheses may or may not be allowed. It should be noted that the word graph 220 illustrated in FIG. 6 is but one example, where other word graphs can take other forms including an N-best list.

As is well known in the art, formation of the word graph commonly is guided by information related to the language been entered. For instance, the recognizer 212 may include or have access to a language model 213. (Herein one language model 213 is illustrated by way of example only.) Language models are well known. For instance, language model 213 can be based on, in whole or in part, a context free grammar or a statistical language model to name just a few. If necessary, but not shown, recognizer 212 can include or have access to other modules or data needed to perform recognition. For instance, a speech recognizer typically will include or have access to an acoustic model. Likewise, a handwriting recognizer typically will include or have access to a hand stroke model.

Generally, one concept is to use only one word graph in a multi-modal decoding process. The scores from each modality are combined in a posterior sense and used to rescore a common word graph. However, to relax the constraint that information from all the modalities should be synchronized, "decoding fronts" are used to record respective positions of each modality as input is provided therefrom.

Figure 7:
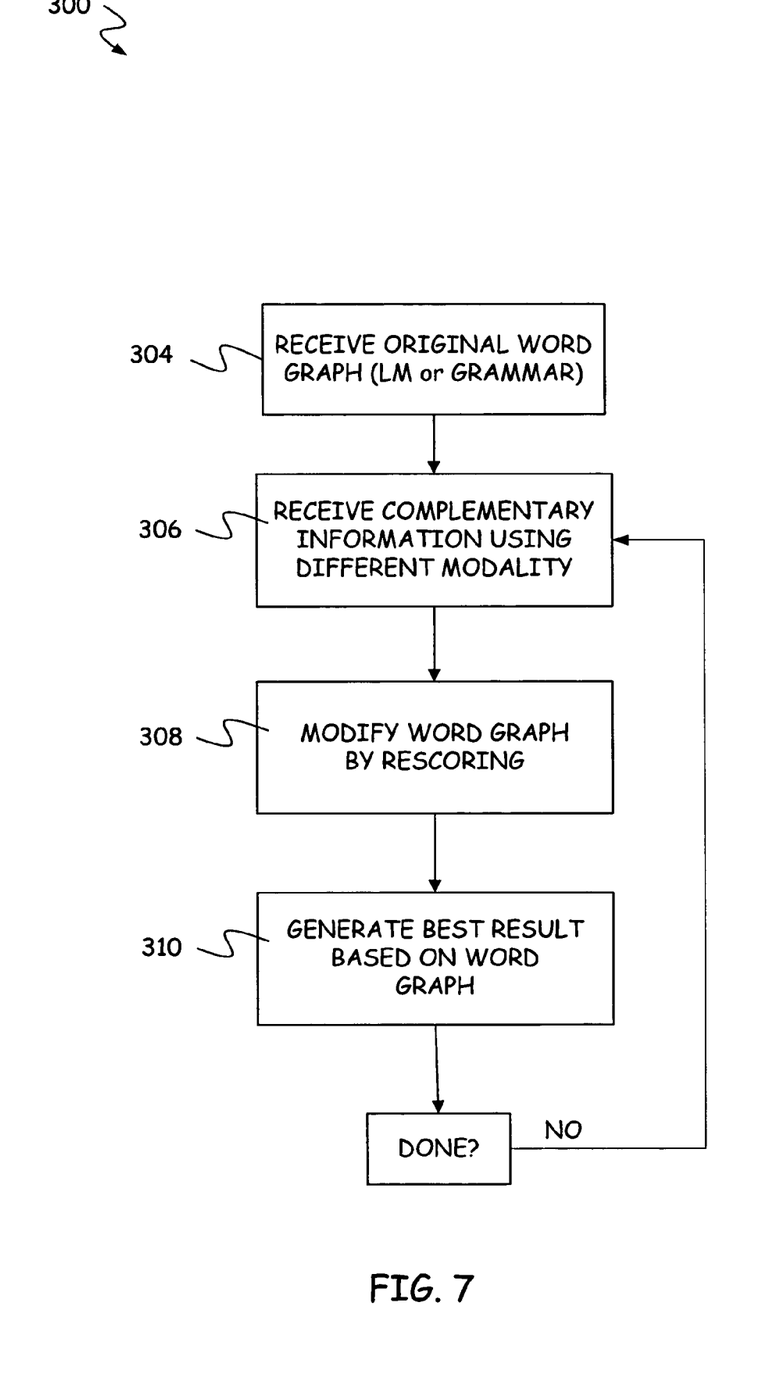
FIG. 7 is a flow diagram of a method of using multiple modalities to improve recognition.

Referring also to FIG. 7, receipt of an original word graph that will be used for processing is indicated at step 304. The recognizer 212 then receives input information through one or more modalities and using the word graph 207, modifies the word graph by rescoring it as indicated at step 308. The initial input can be from one modality; however, two modalities can also be used. When two modalities are being used, the user is in effect providing "complementary" information for the input, or portion thereof.

A result 208 that represents the best hypothesis for the input provided by the user or process is typically rendered to the user such as through a display at step 310.

If the best hypothesis determined at step 310 is not correct, the user or process can provide further complementary information using any one of the modalities to correct the hypothesis, as indicated by returning to step 306. In this instance, the complementary information via one of the input modalities 202, 204 or 205 is used to correct a word or words of the hypothesis and thus can also be referred to as corrective information. Again, step 308, recognizer 212 modifies the word graph 207 with the complementary information provided by the user or process. Modification of the word graph can be considered a pruning process of the word graph 207 that initiates the recognizer 212 to rescore the remaining hypotheses as represented by the remaining word graph in order to ascertain the next best hypothesis given the complementary information. The new hypothesis is then rendered to the user as an improved result 208 at step 310. This iterative process (steps 306, 308 and 310) can be repeated as necessary between the user and the system 200 until the correct input has been obtained. Step 306 during the iterative process may use the same modality as used in the earlier iteration or a different modality. In one embodiment, the initial word graph 207 can be modified in response to a single input modality used by the user. However, in another embodiment, the initial word graph 207 can be modified based on the user or process using two input modalities at the same time.

Figure 8:
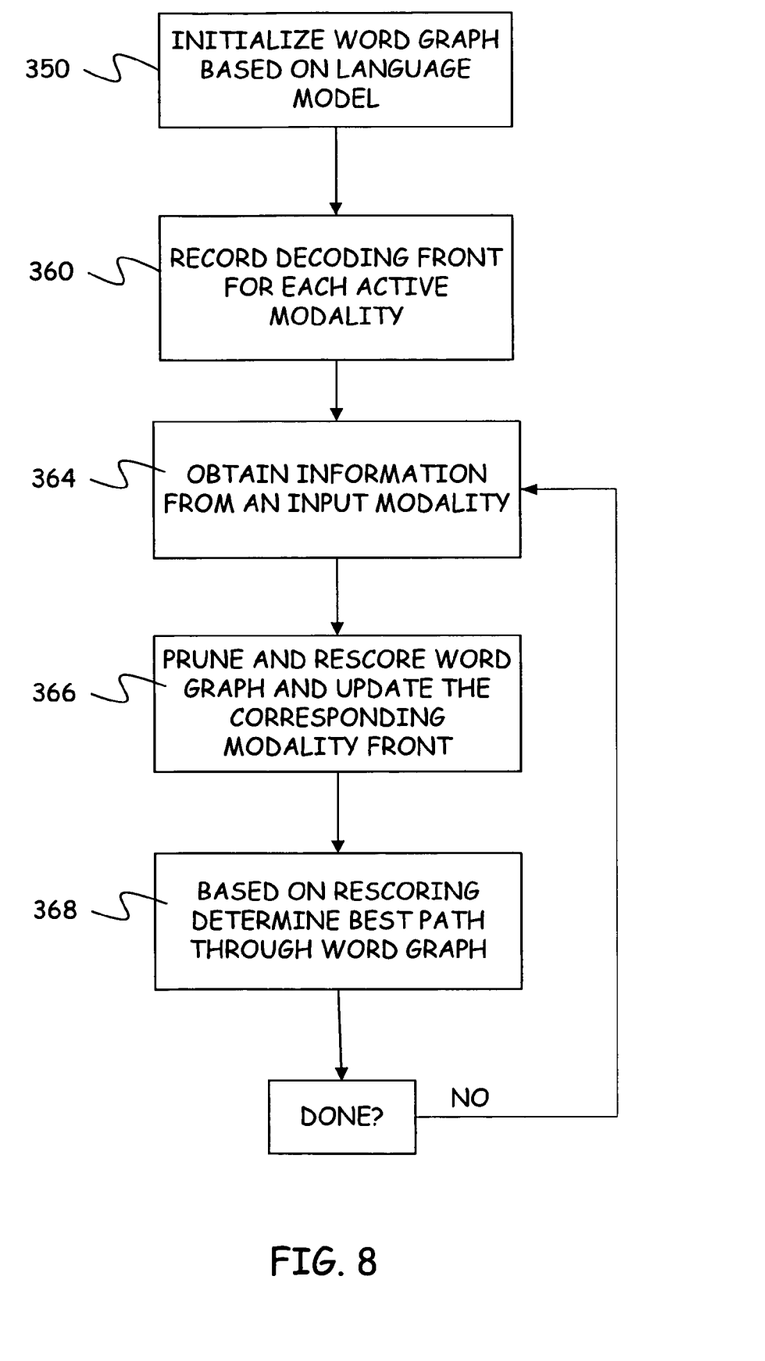
FIG. 8 is a pictorial representation of pruning a word graph.

A schematic flow chart for processing of a word graph is illustrated in FIG. 8. In general, a decoding front is maintained for each modality. A decoding front can be a set of nodes, or their equivalent, in the word graph that records positions the corresponding modality has reached in the word graph. These positions are used as starting points for rescoring and pruning when the next piece of complementary information is received from the user process. The complementary information can be considered as "features". All of the input modalities can be regarded as classifiers with different features. For example, for input via a keyboard, the features are spellings or pronunciations strings (in far-east languages), while for handwriting, the features are hand strokes. Likewise, for speech recognition, the features are acoustic signals, while for lip reading, the features are video signals.

Figure 9:
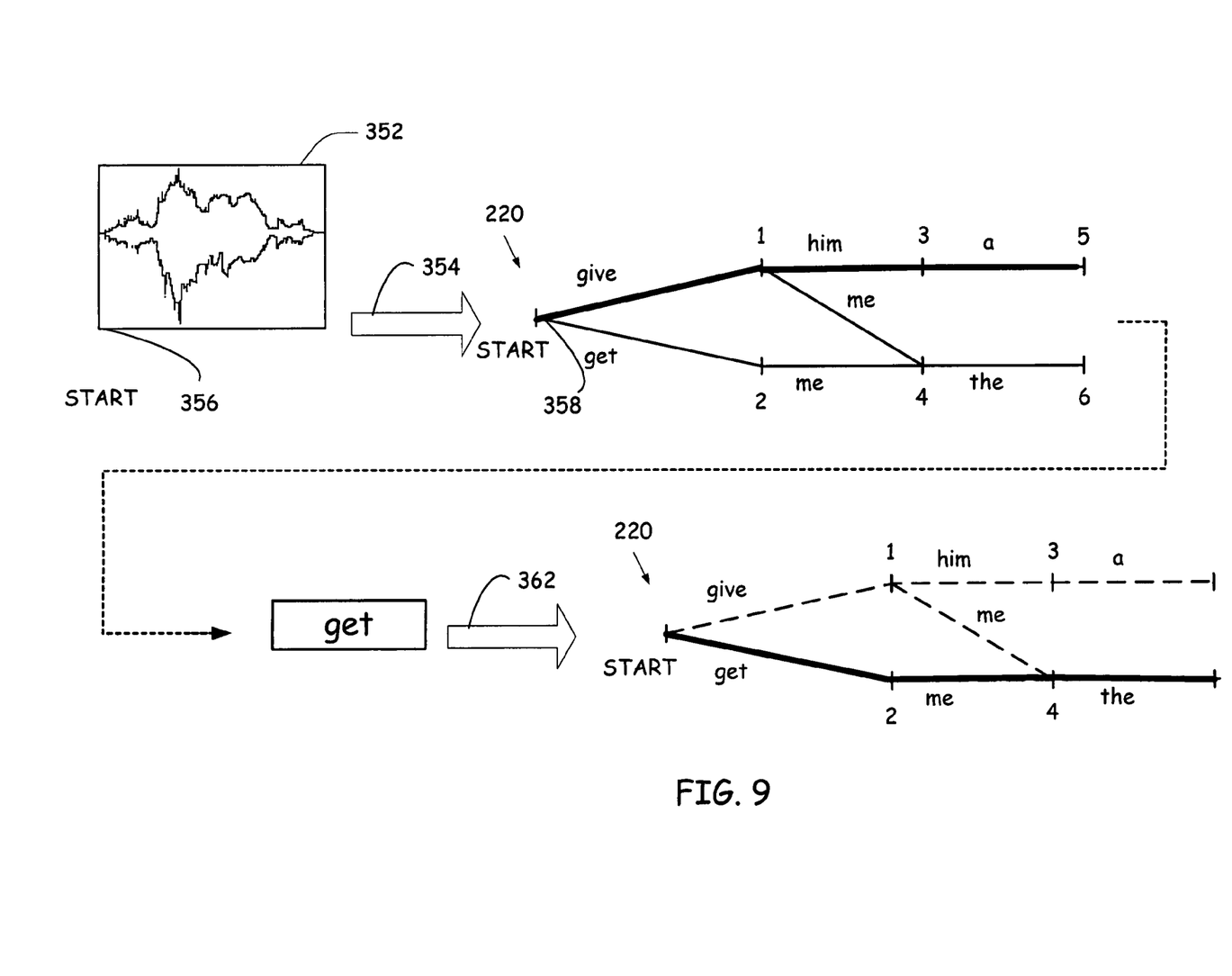
FIG. 9 is a flow diagram of a method of pruning a word graph.

With reference also to FIG. 9, operation of the method of FIG. 8 will be provided. In this example a user provides input initially with speech recognition, although simultaneously input with another modality is also contemplated. The user then uses handwriting to provide corrective information that complements a portion earlier provided. It should be understood that this is but one example and that other combinations of modalities can be implemented. Accordingly, this example should not be considered limiting.

At step 350, the common word graph is initialized based on the language model. In this example, the user provides the input text "get me the". In FIG. 9, the initial word graph is indicated at 220. The word graph 220 is obtained by speech recognition as represented by acoustic signals 352 and processing arrow 354. Node 356 of the acoustic signal corresponds to node 358 of the word graph 220. For purposes of explanation, it is assumed that the best hypothesis for the input text is initially "give him a", which is represented in the word graph 220 by the upper path.

At step 360, the decoding front for each active modality is recorded. In this example, the decoding front for speech recognition is the set of nodes {5,6}. This is due to the fact that speech recognition was used to modify the word graph, where the end nodes of the word graph can be either node 5 or node 6. Since handwriting was not provided the decoding front for this modality is the set {start}.

Processing arrow 362 represents the user using handwriting recognition to change the word "give" to "get". This is represented in FIG. 9 at step 364 where corrective information is received for one or more modalities. At step 366, the word graph 220 is pruned and rescored from the node corresponding to the corrective information, or from the current decoding front for the modality received. The corresponding modality front is also updated.

In one embodiment, simple averaging of the posterior probabilities from all the modalities for each word arc can be used to rescore the word graph 220. At step 368, the best path through the word graph from "start" to the furthest node is then determined based on rescoring. In the example illustrated, it can be seen that the only remaining path after changing "give" to "get" is the lower path of word graph 220. Although the example herein used may be simple, it shows the benefits of using a common word graph and multimodal inputs to improve input processing or recognition.

Although the subject matter has been described in language specific to structural features and/or methodological acts, it is to be understood that the subject matter defined in the appended claims is not limited to the specific features or acts described above as has been held by the courts. Rather, the specific features and acts described above are disclosed as example forms of implementing the claims.

What is claimed is:

1. A method for processing input received by a computing device comprising one or more processors, the method comprising:
    decoding input from a first input modality to produce posterior probabilities for words along paths in a common word graph;
    recording a decoding front for each of a plurality of possible input modalities, each decoding front comprising a set of nodes in the common word graph that define an end of a last word along a path in the common word graph that was assigned a probability by decoding an input from the respective input modality;
    receiving input from a second input modality after recording the decoding front for the second input modality;
    using the nodes of the recorded decoding front for the second input modality to determine where in the common word graph to begin rescoring and pruning the common word graph based on the input from the second input modality;
    using one or more of the processors, rescoring and pruning the common word graph based on averaging posterior probabilities from decoding input from the first input modality and decoding input from the second input modality; and
    outputting a hypothesis for the input based on the common word graph.

2. The method of claim 1 wherein outputting the hypothesis comprises rendering the hypothesis to a user.

3. The method of claim 1 wherein rescoring comprises rescoring the common word graph from a node in the decoding front to a furthest node available in the word graph.

4. The method of claim 1, in which the first input modality is a speech modality, and the second input modality is a handwriting modality.

5. The method of claim 4, in which the first input modality is processed using a speech recognizer with access to an acoustic model, and the second input modality is processed using a handwriting recognizer with access to a hand stroke model.

6. The method of claim 1, in which the plurality of possible modalities comprise speech, handwriting, and keystrokes.

7. The method of claim 1 further comprising updating the decoding front for the second input modality so that it comprises a set of nodes in the common word graph where each node defines the end of a word that was assigned a probability by decoding the input of the second input modality.

8. A computer storage medium having computer-executable instructions that when executed by a computer perform steps to process input received by the computer comprising the steps of:
    receiving input using a first modality;
    modifying a word graph based on the input; and
    rendering a hypothesis to a user for the input based on the word graph, and repeating the following steps until a desired hypothesis is obtained:
        modifying the word graph based on complementary information received using a second modality, the complementary information corresponding to at least a portion of the input, wherein the second modality is different from the first modality, in which modifying the word graph includes rescoring the word graph based on averaging posterior probabilities from the modalities of the input and the complementary information; and
    rendering a new hypothesis to the user for the input based on the word graph.

9. The computer-readable medium of claim 8 wherein the step of modifying the word graph includes pruning a word graph.

10. The computer-readable medium of claim 8 wherein the step of modifying the word graph includes recording relevant nodes of each modality with respect to the word graph and rescoring the word graph includes rescoring the word graph beginning from a recorded node.

11. A computing device comprising:
    a first component configured to provide input into the computing device using a first modality;
    a second component configured to provide input into the computing device using a second modality; and
    a recognizer configured to receive input from the first component and the second component and configured to modify a common word graph based on input from the first component and input from the second component, wherein modifying a common word graph based on input from the second component comprises rescoring words in the common word graph beginning with words that occur after nodes set in a recorded decoding front for the second modality based on the input from the second component.

12. The computing device of claim 11 wherein the recognizer is configured to render a hypothesis to the user based on the word graph.

13. The computing device of claim 12 wherein the recognizer is configured to modify the word graph by pruning and rescoring the word graph.

14. The computing device of claim 13 wherein the recognizer is configured to repetitively receive corrective information using the second modality, modify the common word graph, and render a new hypothesis to the user based on the word graph until the new hypothesis is a desired hypothesis.

* * * * *